United States Patent
Kegin et al.

(10) Patent No.: US 12,281,754 B1
(45) Date of Patent: Apr. 22, 2025

(54) LUBRICATOR FOR BYPASS PLUNGER

(71) Applicant: Tri-Lift Services, Inc., Crescent, OK (US)

(72) Inventors: Kevin L. Kegin, Crescent, OK (US); Joey B. Thompson, Guthrie, OK (US)

(73) Assignee: Tri-Lift Services, Inc., Crescent, OK (US)

( * ) Notice: Subject to any disclaimer, the term of this patent is extended or adjusted under 35 U.S.C. 154(b) by 0 days.

(21) Appl. No.: 18/591,833

(22) Filed: Feb. 29, 2024

(51) Int. Cl.
*F16N 7/38* (2006.01)
*E21B 43/12* (2006.01)
*F04B 47/12* (2006.01)
*F16N 11/04* (2006.01)

(52) U.S. Cl.
CPC .............. *F16N 7/38* (2013.01); *E21B 43/121* (2013.01); *F04B 47/12* (2013.01); *F16N 11/04* (2013.01)

(58) Field of Classification Search
CPC .......... E21B 43/121; F16N 7/38; F04B 47/12
See application file for complete search history.

(56) References Cited

U.S. PATENT DOCUMENTS

| | | | |
|---|---|---|---|
| 5,253,713 A | 10/1993 | Gregg et al. | |
| 6,705,404 B2* | 3/2004 | Bosley | E21B 43/123 166/372 |
| 10,753,186 B1 | 8/2020 | Zimmerman, Jr. et al. | |
| 11,028,661 B2 | 6/2021 | Kegin | |
| 11,754,069 B2 | 9/2023 | Kegin | |
| 11,971,064 B2* | 4/2024 | Sutherland | F16B 39/04 |
| 12,071,836 B2* | 8/2024 | Boyd | E21B 43/121 |
| 2003/0047316 A1* | 3/2003 | Bosley | E21B 43/123 166/372 |
| 2005/0022994 A1* | 2/2005 | Wilson | E21B 27/02 166/305.1 |
| 2005/0194149 A1* | 9/2005 | Giacomino | E21B 43/121 166/250.01 |
| 2006/0108126 A1 | 5/2006 | Horn et al. | |
| 2006/0124292 A1* | 6/2006 | Victor | E21B 43/121 166/105 |
| 2009/0032243 A1 | 2/2009 | Victor | |
| 2009/0188673 A1 | 7/2009 | Hearn et al. | |
| 2011/0073322 A1* | 3/2011 | Smith | E21B 43/121 166/112 |
| 2012/0132437 A1 | 5/2012 | Gong et al. | |
| 2016/0090827 A1* | 3/2016 | Agarwal | E21B 43/13 166/311 |
| 2017/0107800 A1 | 4/2017 | Townsend | |
| 2017/0183945 A1 | 6/2017 | Tolman et al. | |
| 2018/0100381 A1 | 4/2018 | Agarwal et al. | |

(Continued)

*Primary Examiner* — Shane Bomar
(74) *Attorney, Agent, or Firm* — Dunlap Codding, P.C.

(57) ABSTRACT

A lubricator for a plunger lift system includes a tubular body, a bumper housing, a bumper sub, a first spring, and a second spring. The bumper housing is disposed in the tubular body and has a chamber, a lower end, and an upper end. The lower end is open to receive an upper end of a shift valve of a bypass plunger. The bumper sub has a lower end and an upper end and is slidably disposed in the chamber of the bumper housing. The first spring is disposed in the chamber to absorb an impact force applied to the bumper sub by the shift valve. The second spring is disposed in the tubular body to absorb an impact force applied to the lower end of the bumper housing by a plunger body of the bypass plunger.

18 Claims, 7 Drawing Sheets

(56) References Cited

U.S. PATENT DOCUMENTS

| | | |
|---|---|---|
| 2020/0182401 A1 | 6/2020 | Eisses et al. |
| 2021/0054711 A1 | 2/2021 | Kegin |
| 2021/0054839 A1 | 2/2021 | Kegin |
| 2021/0079911 A1 | 3/2021 | Boyd et al. |

* cited by examiner

LUBRICATOR FOR BYPASS PLUNGER

BACKGROUND

Plunger lift systems are used in oil and gas wells when the bottom hole pressure decreases to a point where fluid cannot be effectively lifted to the surface. A plunger lift system utilizes a plunger, which is a piston-like object. The plunger is placed inside the production tubing, and by controlling the pressure in the production tubing, the plunger is caused to move up and down the tubing. A valve at the surface is operated to control the pressure. When the valve is closed, the pressure increases, so when the valve is opened, the plunger is caused to rise to the top, carrying the fluids to the surface. When the valve is closed, the plunger returns to the bottom.

A lubricator is a piping arrangement installed at the surface to capture the plunger when the plunger is in the top position. The lubricator includes fluid outlets connected to surface piping and a bumper spring. The bumper spring absorbs the impact force of the plunger upon the plunger arriving at the top position. The lubricator may include one or more catchers adapted to hold the plunger selectively within the lubricator.

A bypass plunger is a type of plunger with a shift valve, which when open, allows fluid to pass through the plunger and increase the velocity of the plunger as the plunger travels down the tubing. One version of a bypass plunger is known as a sliding sleeve, which is a center rod-style bypass plunger. The shift valve typically includes a fish neck extending from the upper end of the bypass plunger, and the shift valve is caused to open by the fish neck contacting a strike plate incorporated as part of the lubricator. The lubricator receives the fish neck, and the contact with the strike plate causes the shift valve to move to the open position. A problem encountered with sliding sleeve bypass plungers is that the upward velocity of the plunger can cause damage to the fish neck with repeated contact with the strike plate.

A need exists for an improved lubricator capable of withstanding the impact forces from the shift valve on the strike plate and the plunger body on the lubricator. It is to such an apparatus that the inventive concepts disclosed herein are directed.

DETAILED DESCRIPTION OF EXEMPLARY EMBODIMENTS

The inventive concepts disclosed are generally directed to a lubricator for a plunger lift system that includes a tubular body, a bumper housing, a bumper sub, a first spring, and a second spring. The tubular body has a sidewall and a closed end. The bumper housing is disposed in the tubular body and has a chamber, a first end, and a second end. The lower end is open to receive an upper end of a shift valve of a bypass plunger. The bumper sub has an upper end and a lower end. The bumper sub is slidably disposed in the chamber of the bumper housing. The lower end of the bumper sub forms a strike plate engageable with the upper end of the shaft valve of the bypass plunger. The first spring is disposed in the chamber of the bumper housing in a way to absorb an impact force applied to the bumper sub by the shift valve of the bypass plunger. The second spring is disposed in the tubular body between a portion of the bumper housing and a portion of the tubular body in a way to absorb an impact force applied to the bumper housing by a plunger body of the bypass plunger.

In another version, the inventive concepts disclosed are directed to a bumper assembly for a plunger lift system including a bumper housing, a bumper sub, a first spring, and a second spring. The bumper housing is disposable in a tubular body of a lubricator and has a chamber, a first end, and a second end. The bumper sub has an upper end and a lower end. The bumper sub is slidably disposed in the chamber of the bumper housing. The lower end of the bumper sub forms a strike plate engageable with the upper end of the shaft valve of the bypass plunger. The first spring is disposed in the chamber of the bumper housing between the upper end of the bumper sub and the second end of the bumper housing in a way to absorb an impact force applied to the bumper sub by the shift valve of the bypass plunger. The second spring is disposable between a portion of the bumper housing and a portion of the tubular body of the lubricator in a way to absorb an impact force applied to the bumper housing by a plunger body of the bypass plunger.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements and may include other elements not expressly listed or inherently present therein.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, the use of the "a" or "an" is employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
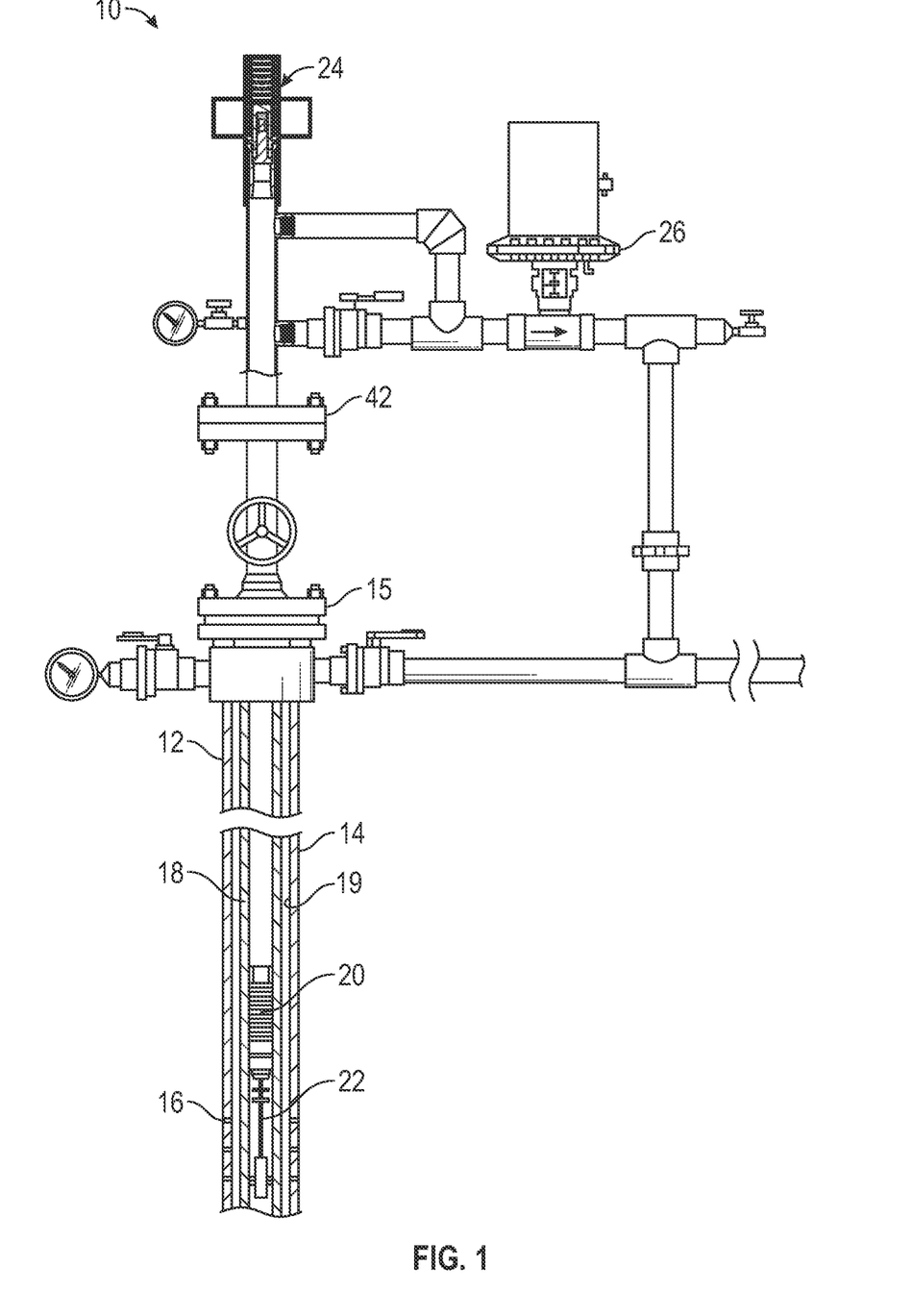
FIG. 1 is an exemplary view of a plunger lift system for removing fluid from a well bore illustrating a bypass plunger at the bottom of the well bore.

Referring now to the drawings, and in particular to FIG. 1, a plunger lift system 10 for removing fluid, such as oil and water, from a well bore 12 is schematically illustrated. The well bore 12 is lined with a casing 14 extending downwardly from a wellhead 15. The casing 14 provides a permanent borehole through which production operations may be conducted. The casing 14 is affixed in the well bore 12 in a conventional manner, such as by cement (not shown), and is provided with perforations 16 open to a producing subterranean formation (also not shown).

The plunger lift system 10 includes a tubing string 18, a plunger 20 (FIGS. 1, 4, and 5), a bottom bumper 22, a lubricator 24, and a control valve 26. The tubing string 18 provides fluid communication between the producing subterranean formation and the surface, so a reservoir fluid (not shown), for example, water and/or oil and/or natural gas, is produced through the tubing string 18. The casing 14 and the tubing string 18 define an annulus 19, providing fluid communication through the well bore 12.

The bypass plunger 20 is illustrated as a bypass plunger known as a sliding sleeve bypass plunger. The bypass plunger 20 includes a body 27 and a shift valve 28, which, when open, allows fluid to pass through the bypass plunger 20 and thereby increase the velocity of the bypass plunger 20 as the bypass plunger 20 travels down the tubing string 18. The shift valve 28 may include a fish neck 29 extending from the upper end of the body 27. The shift valve 28 is caused to open by the fish neck 29 contacting a strike plate 91 incorporated as part of the lubricator 24.

The bypass plunger 20 is dropped into the tubing string 18. When the control valve 26 is closed, pressure may build, so when the control valve 26 is opened, the bypass plunger 20 rises to the lubricator 24, carrying the fluids to the surface. The bypass plunger 20 returns to the bottom when the control valve 26 is closed. Through the operation of the control valve 26, a liquid slug is cyclically brought to the surface of the wellbore 12 from stored gas pressure. In the off cycle, the bypass plunger 20 falls, and pressure builds again in the wellbore 12.

Referring now to FIGS. 2-5, the lubricator 24 includes a tubular body 30 and a bumper assembly 33. The bumper assembly 33 includes a bumper housing 32, a bumper sub 34, a first spring 36, and a second spring 38. The tubular body 30 has an open end 40 connectable to the wellhead 15 in a suitable manner, such as with flanges 42 (FIG. 1) or by threads or by welding. The tubular body 30 defines a sidewall 44 and a closed end 46. The tubular body 30 may be constructed of multiple pieces, such as a body portion 48 and a cap portion 50. The body portion 48 includes one or more fluid outlets 51a and 51b. An upper end of the body portion 48 may define an interior shoulder 55. The cap portion 50 may be threadingly connected to the body portion 48 to provide access to the interior of the body portion 48. To facilitate connection to and removal from the body portion 48, the cap portion 50 has a pair of handles 52. The cap portion 50 defines the closed end 46 of the tubular body 30.

The bumper housing 32 is disposed in the tubular body 30 and is configured to support the bumper sub 34, the first spring 36, and a portion of the second spring 38. The bumper housing 32 has an exterior shoulder 57 for supporting engagement with the interior shoulder 55 of the tubular body 30. The bumper housing 32 has a chamber 54, a lower end 56, and an upper end 58. The lower end 56 is open and sized to receive the fish neck 29 of the shift valve 28 into the chamber 54 upon the bypass plunger 20 reaching the lubricator 24. A lower portion of the chamber 54 may be tapered to facilitate entry of the fish neck 29 into the bumper housing 32.

In one embodiment, the bumper housing 32 includes a body portion 60 and a cap portion 62 connected to the body portion 60 upon the first spring 36 being positioned in the cap portion 62. The body portion 60 has a first end 63, a second end 64, a first bore 66 with a first diameter, and a second bore 67 with a second diameter. The first diameter is sized to receive the fish neck 29 of the bypass plunger 20. The second diameter is greater than the first diameter and is sized to slideably receive a portion of the bumper sub 34, as discussed below. The second bore 67 is partly defined by an internal shoulder 69 of the body portion 60.

The cap portion 62 has a first end 68 connected to the second end 64 of the body portion 60, a second end 70, and a bore 72 extending from the first end 68 of the cap portion 62 toward the second end 70 of the cap portion 62. The bore 72 of the cap portion has a diameter less than the second diameter of second bore 67 of the body portion 60. The first end 68 of the cap portion 62 cooperates with the internal shoulder 69 of the body portion 60 to define the ends of the second bore 67.

The first end 68 of the cap portion 62 has a flange 84 and is connectable to the body portion 60 of the bumper housing 32. The bore 72 extends from the first end 68 of the cap portion 62 toward the second end 70 of the cap portion 62. The bore 72 of the cap portion 62 may have a diameter less than the diameter of the body portion 60 of the bumper housing 32. A portion of the bumper sub 34 is inserted into the bore 72 of the cap portion 62 to stabilize the bumper sub 34 laterally. In one embodiment, the diameter of the cap portion 62 is less than the interior diameter of the cap portion 50 of the tubular body 30 so the cap portion 50 of the tubular body 30 and the cap portion 62 of the bumper housing 32 cooperate to form a spring receiving space 86 for supporting at least a portion of the second spring 38.

Figure 3:
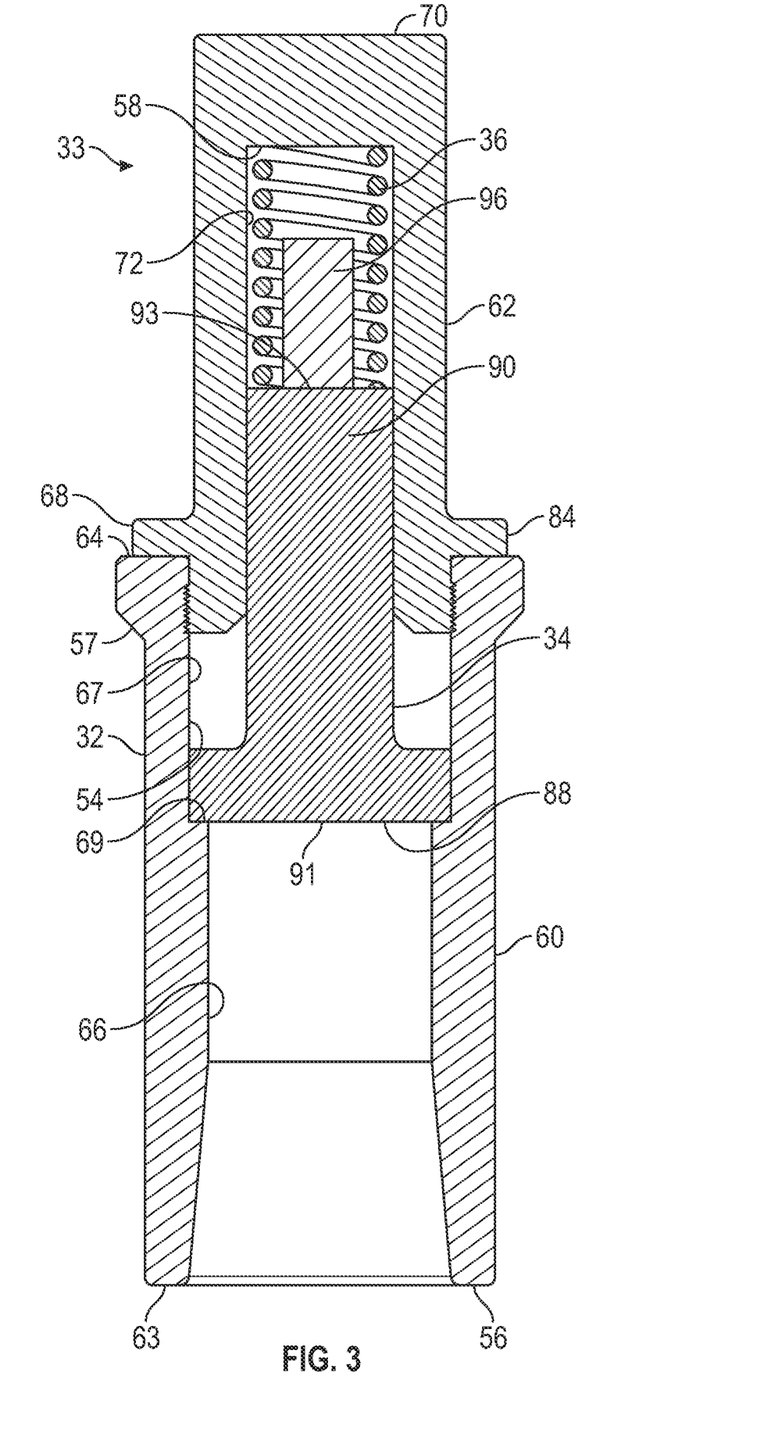
FIG. 3 is a sectional view of a bumper assembly with a second spring removed for clarity.

Still referring to FIG. 3, the bumper sub 34 has a flanged portion 88 and a shaft portion 90 extending from the flanged portion 88. The bumper sub 34 is slidably disposed in the chamber 54 of the bumper housing 32. The lower end of the flanged portion 88 forms a strike plate 91 engageable with the fish neck 29 (or the uppermost end of the bypass plunger 20) of the shift valve of the bypass plunger 20. The diameter of the flanged portion 88 is such that the flanged portion 88 is captured between the internal shoulder 69 and the first end of the cap portion 62. The shaft portion 90 of the bumper sub 34 has a diameter and length, so the shaft portion 90 is slidably disposed in the bore 72 of the cap portion 62 to stabilize the bumper sub 34 laterally.

The first spring 36 is positioned between an upper end 93 of the bumper sub 34 and the upper end 58 of the bumper housing 32. The first spring 36 is disposed in the chamber 54 of the bumper housing 32 in a way to absorb an impact force applied to the bumper sub 34 by the shift valve 28 of the bypass plunger 20. A bumper stop 96 may be positioned between the upper end 93 of the bumper sub 34 and the second end 70 of the bumper housing 32. The bumper stop 96 is a rigid member having a length such that the bumper stop 96 prevents the first spring 36 from being further compressed upon the body 30 of the bypass plunger 20 contacting the lower end 56 of the bumper housing 32. The bumper stop 96 may be constructed of any suitable rigid material, such as steel.

Figure 2:
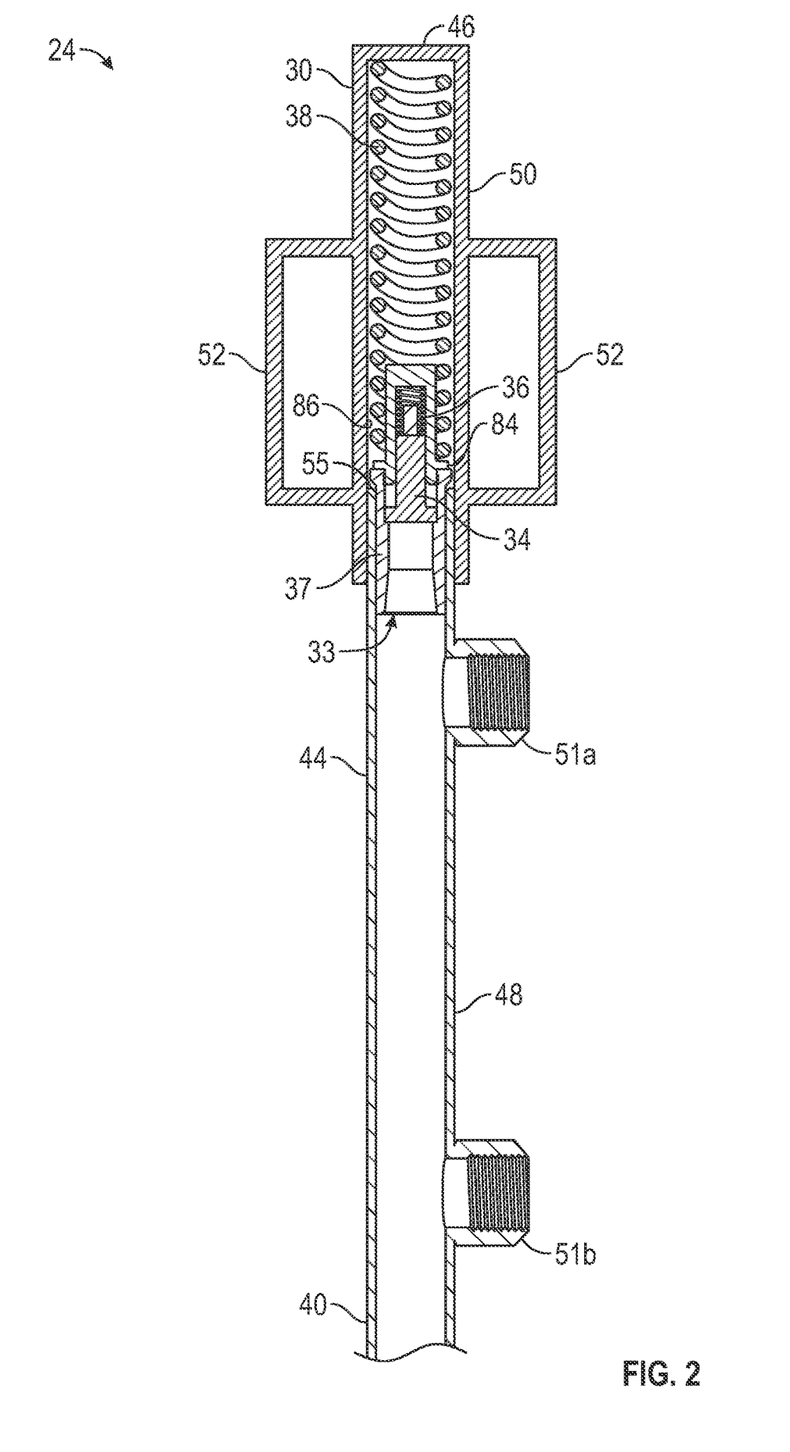
FIG. 2 is a sectional view of a lubricator constructed in accordance with the inventive concepts disclosed herein.

The second spring 38 is disposed in the tubular body 30 between the flange 84 of the cap portion 62 of the bumper housing 32 and the closed end 46 of the tubular body 30 in a way to absorb an impact force applied to the bumper housing 32 by the plunger body 27 of the bypass plunger 20. In this way, the first spring 36 is independent from the second spring 38, so as the second spring 38 is being compressed, the first spring 36 is not required to be compressed. The first spring 36 and the second spring 38 may be compression springs, with the first spring 36 having a first spring rate and the second spring having a second spring rate. In one embodiment, the first spring rate is less than the second spring rate. Also, the first spring 36 has an outer diameter, and the second spring 38 has an outer diameter, with the outer diameter of the first spring 36 being less than the outer diameter of the second spring 38.

Figure 4:
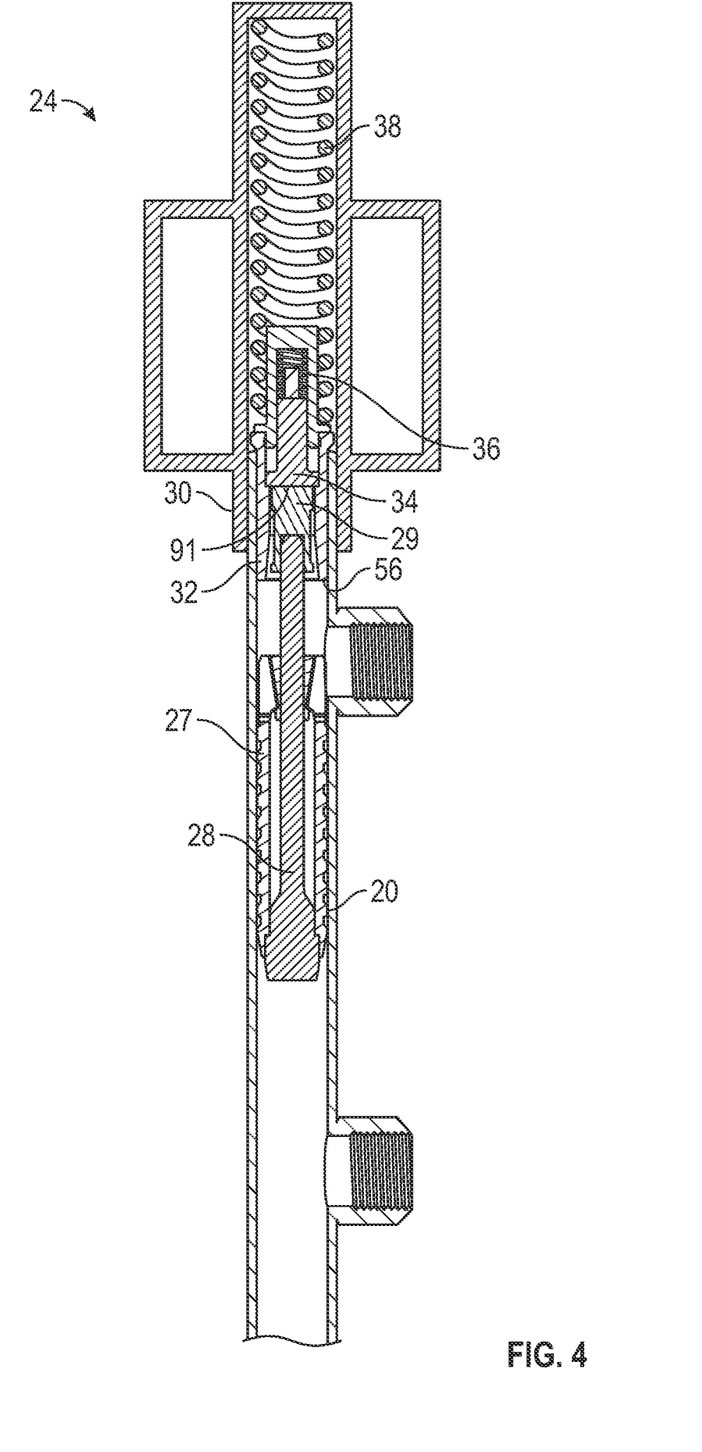
FIG. 4 is a sectional view of the lubricator illustrating a shift valve of the bypass plunger impacting a strike plate of the bumper assembly.
Figure 5:
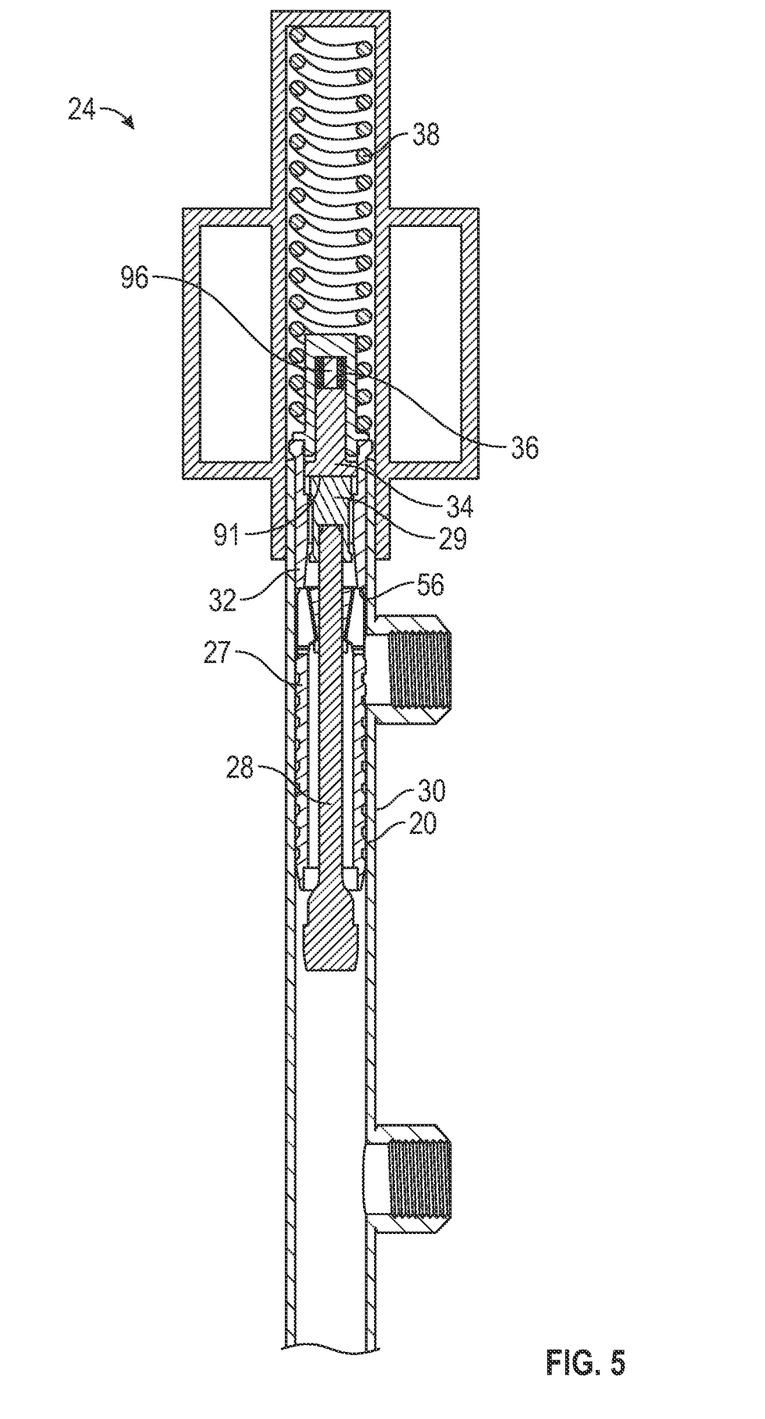
FIG. 5 is a sectional view of the lubricator illustrating a body of the bypass plunger impacting a body portion of the bumper assembly.

Referring to FIG. 4, as the bypass plunger 20 travels upwardly, the fish neck 29 passes through the lower end 56 of the bumper housing 32 and contacts the strike plate 91 of the bumper sub 34, causing the shift valve 28 to move from the closed positioned (FIG. 4) to the open position (FIG. 5). The impact force applied to the bumper sub 34 causes the bumper sub 34 to slide relative to the bumper housing 32, thus compressing the first spring 36 so the impact force to the bumper sub 34 is absorbed by the first spring 36.

As shown in FIG. 5, the body 27 of the bypass plunger 20 continues to travel upwardly with the shift valve 28 now in the open position until the body 27 of the bypass plunger 20 contacts the first end 56 of the bumper housing 32. The impact force applied to the bumper housing 32 causes the bumper housing 32 to slide relative to the tubular body 30, thus compressing the second spring 38 so the impact force to the bumper housing 32 is absorbed by the second spring 38. As shown in FIG. 5, the distal end 92 of the bumper sub 34 engages the bumper stop 96, so further compression of the first spring 36 is limited as the body 27 of the bypass plunger 20 impacts the bumper housing 32. The result is the first spring 36 is not being further compressed as the second spring 38 is being compressed.

Figure 6:
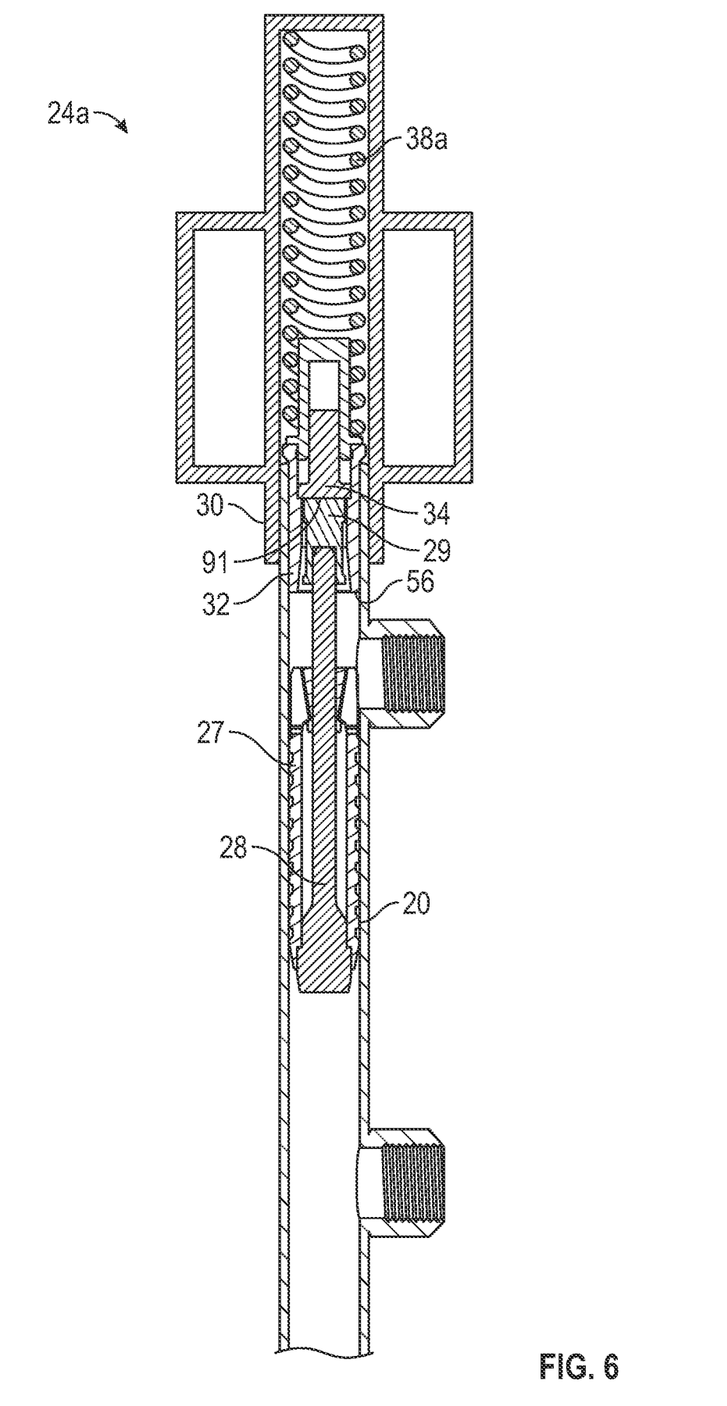
FIG. 6 is a sectional view of another embodiment of a lubricator constructed in accordance with the inventive concepts disclosed herein illustrating the shift valve of the bypass plunger impacting a strike plate of a bumper assembly.
Figure 7:
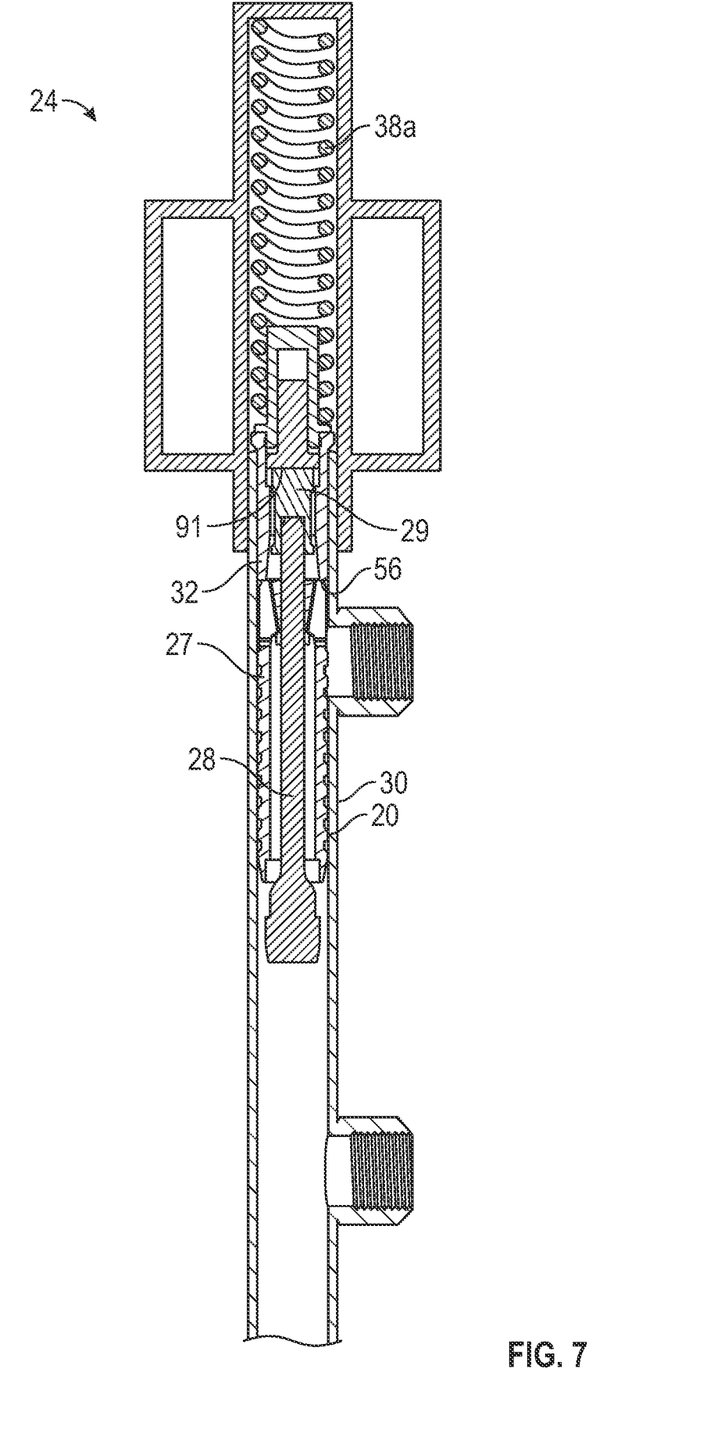
FIG. 7 is a sectional view of the lubricator of FIG. 6 illustrating a body of the bypass plunger impacting a body portion of the bumper assembly.

Referring now to FIGS. 6 and 7, another exemplary embodiment of a lubricator 24*a* constructed in accordance with the inventive concepts disclosed herein is illustrated in conjunction with the bypass plunger 20. The lubricator 24*a* is similar in construction to the lubricator 24, except the lubricator 24*a* is void of the first spring 36 in the bumper housing 32 and the bumper stop 96.

Referring to FIG. 6, as the bypass plunger 20 travels upwardly, the fish neck 29 passes through the lower end 56 of the bumper housing 32 and contacts the strike plate 91 of the bumper sub 34, causing the shift valve 28 to move from the closed positioned (FIG. 6) to the open position (FIG. 7). The impact force applied to the bumper sub 34 causes the bumper sub 34 to slide relative to the bumper housing 32, thereby absorbing at least a portion of the impact force of the shift valve 28 to the bumper sub 34.

As shown in FIG. 7, the body 27 of the bypass plunger 20 continues to travel upwardly with the shift valve 28 now in the open position until the body 27 of the bypass plunger 20 contacts the first end 56 of the bumper housing 32. The impact force applied to the bumper housing 32 causes the bumper housing 32 to slide relative to the tubular body 30, thus compressing a spring 38*a* so the spring 38*a* absorbs the impact force to the bumper housing 32.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A lubricator for a plunger lift system, comprising:
   a tubular body having a sidewall and a closed end;
   a bumper housing disposed in the tubular body, the bumper housing having a chamber, a lower end, and an upper end, the lower end being open to receive an upper end of a shift valve of a bypass plunger;
   a bumper sub having a lower end and an upper end, the bumper sub slidably disposed in the chamber of the bumper housing, the lower end of the bumper sub forming a strike plate engageable with the upper end of the shift valve of the bypass plunger;
   a first spring disposed in the chamber of the bumper housing between the upper end of the bumper sub and the second end of the bumper housing in a way to absorb an impact force applied to the bumper sub by the shift valve of the bypass plunger; and
   a second spring disposed in the tubular body between a portion of the bumper housing and a portion of the tubular body in a way to absorb an impact force applied to the lower end of the bumper housing by a plunger body of the bypass plunger.

2. The lubricator of claim 1, where the first spring has a first spring rate and the second spring has a second spring rate, and wherein the first spring rate is less than the second spring rate.

3. The lubricator of claim 2, where the first spring has a first diameter and the second spring has a second diameter, and wherein the first diameter is less than the second diameter.

4. The lubricator of claim 1, where the first spring has a first diameter and the second spring has a second diameter, and wherein the first diameter is less than the second diameter.

5. The lubricator of claim 1, wherein the tubular body has an interior shoulder and wherein the bumper housing has an exterior shoulder engaged with the interior shoulder of the tubular body.

6. The lubricator of claim 1, wherein the bumper sub has a flanged portion and a shaft portion extending from the flanged portion, and wherein the bumper housing comprises:
   a body portion having a first end, a second end, and a bore having a diameter; and
   a cap portion having a first end connected to the second end of the body portion, a second end, and a bore extending from the first end of the cap portion toward the second end of the cap portion, the bore of the cap portion having a diameter less than the diameter of the body portion,
   wherein the flanged portion of the bumper sub is disposed in the bore of the body portion and the shaft portion of the bumper sub is disposed in the bore of the cap portion.

7. The lubricator of claim 6, wherein the tubular body has an interior shoulder and wherein the second end of the body has an external shoulder engaged with the internal shoulder of the tubular body.

8. The lubricator of claim 6, further comprising a rigid bumper stop positioned between the upper end of the bumper sub and the second end of the bumper housing.

9. The lubricator of claim 6, wherein the cap portion has a spring retainer portion and wherein at least a portion of the second spring is positioned about the spring retainer portion of the cap portion.

10. A bumper assembly for a plunger lift system, comprising:
    a bumper housing disposable in a tubular body of a lubricator, the bumper housing having a chamber, a lower end, and an upper end, the lower end being open to receive an upper end of a shift valve of a bypass plunger;
    a bumper sub having a lower end and an upper end, the bumper sub slidably disposed in the chamber of the bumper housing, the lower end of the bumper sub forming a strike plate engageable with the upper end of the shift valve of the bypass plunger;
    a first spring disposed in the chamber of the bumper housing between the upper end of the bumper sub and the second end of the bumper housing in a way to absorb an impact force applied to the bumper sub by the shift valve of the bypass plunger; and
    a second spring disposed in the tubular body between a portion of the bumper housing and a portion of the tubular body in a way to absorb an impact force applied to the lower end of the bumper housing by a plunger body of the bypass plunger.

11. The bumper assembly of claim 10, where the first spring has a first spring rate and the second spring has a second spring rate, and wherein the first spring rate is less than the second spring rate.

12. The bumper assembly of claim 11, where the first spring has a first diameter and the second spring has a second diameter, and wherein the first diameter is less than the second diameter.

13. The bumper assembly of claim 10, where the first spring has a first diameter and the second spring has a second diameter, and wherein the first diameter is less than the second diameter.

14. The bumper assembly of claim 10, wherein the tubular body has an interior shoulder and wherein the bumper housing has an exterior shoulder engaged with the interior shoulder of the tubular body.

15. The bumper assembly of claim 10, wherein the bumper sub has a flanged portion and a shaft portion extending from the flanged portion, and wherein the bumper housing comprises:
    a body portion having a first end, a second end, and a bore having a diameter; and
    a cap portion having a first end connected to the second end of the body portion, a second end, and a bore extending from the first end of the cap portion toward the second end of the cap portion, the bore of the cap portion having a diameter less than the diameter of the body portion,
    wherein the flanged portion of the bumper sub is disposed in the bore of the body portion and the shaft portion of the bumper sub is disposed in the bore of the cap portion.

16. The bumper assembly of claim 15, wherein the tubular body has an interior shoulder and wherein the second end of the body has an external shoulder engaged with the internal shoulder of the tubular body.

17. The bumper assembly of claim 15, further comprising a rigid bumper stop positioned between the upper end of the bumper sub and the second end of the bumper housing.

18. The bumper assembly of claim 15, wherein the cap portion has a spring retainer portion, and wherein at least a portion of the second spring is positioned about the spring retainer portion of the cap portion.

* * * * *

UNITED STATES PATENT AND TRADEMARK OFFICE
CERTIFICATE OF CORRECTION

| | | |
|---|---|---|
| PATENT NO. | : 12,281,754 B1 | Page 1 of 1 |
| APPLICATION NO. | : 18/591833 | |
| DATED | : April 22, 2025 | |
| INVENTOR(S) | : Kevin L. Kegin and Joey B. Thompson | |

It is certified that error appears in the above-identified patent and that said Letters Patent is hereby corrected as shown below:

In the Claims

Column 6, Line 52, Claim 1: Delete "second end" and replace with -- upper end --

Column 7, Line 49, Claim 10: Delete "second end" and replace with -- upper end --

Signed and Sealed this
Twenty-seventh Day of May, 2025

Coke Morgan Stewart
*Acting Director of the United States Patent and Trademark Office*